B. F. BARR.
Manure-Fork.

No. 207,338. Patented Aug. 27, 1878.

Witnesses:
James Martin Jr.
D. P. Cowe

Inventor:
Benjamin F. Barr
by
Mason, Fenwick & Lawrence

UNITED STATES PATENT OFFICE.

BENJAMIN F. BARR, OF SHADY GROVE, PENNSYLVANIA.

IMPROVEMENT IN MANURE-FORKS.

Specification forming part of Letters Patent No. 207,338, dated August 27, 1878; application filed March 9, 1878.

*To all whom it may concern:*

Be it known that I, BENJAMIN F. BARR, of Shady Grove, in the county of Franklin and State of Pennsylvania, have invented a new and useful Improvement in Manure-Forks, which improvement is fully set forth in the following specification and accompanying drawings, in which latter—

Figure 1:
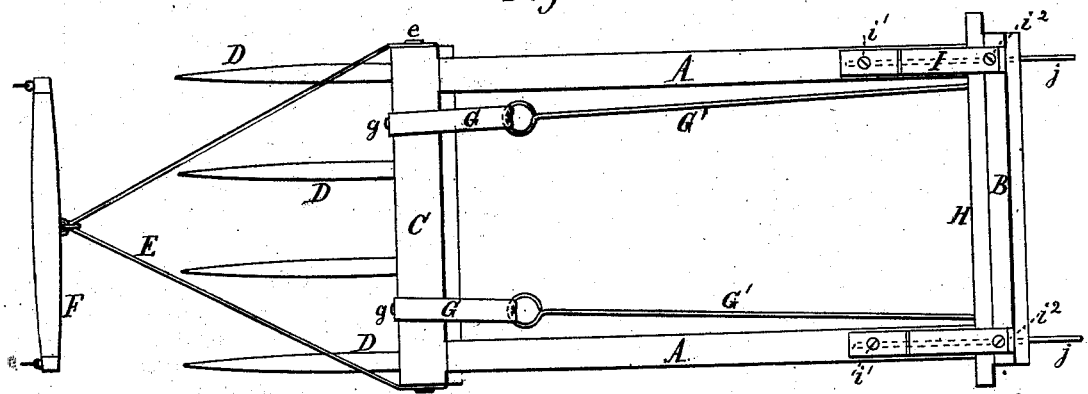
Figure 2:
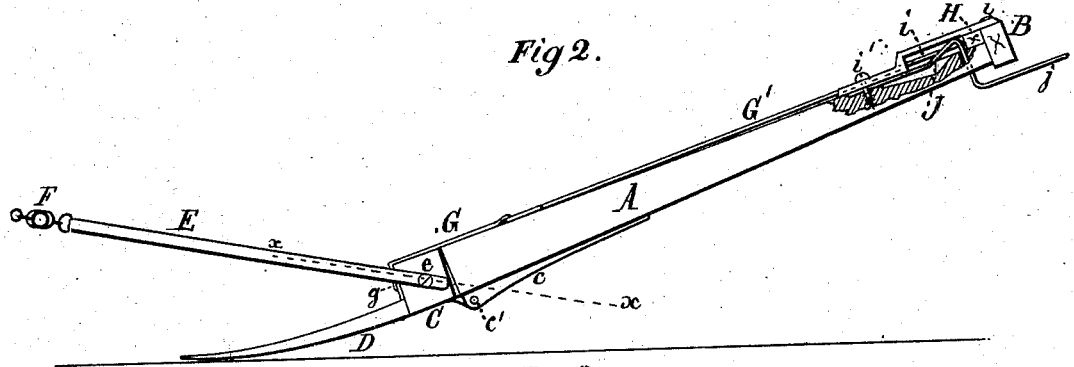
Figure 3:
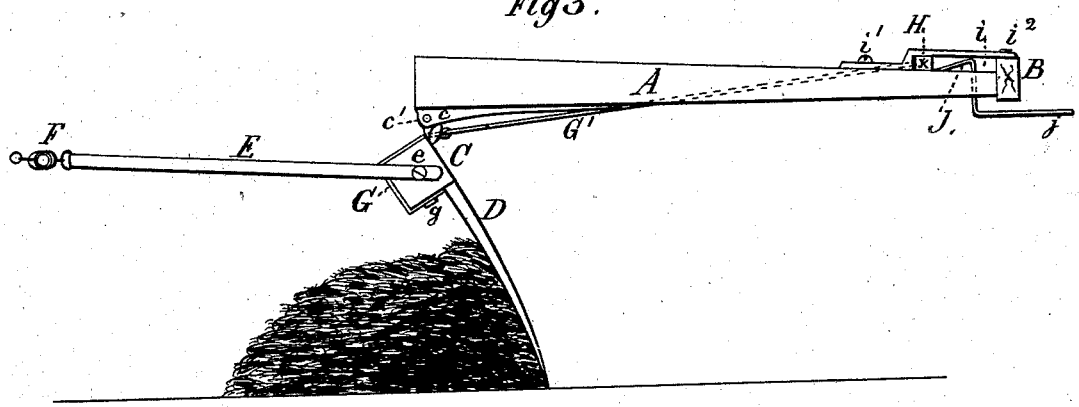

Figure 1 is a plan view of my manure-fork. Fig. 2 is an elevation of the same, a portion of one of the side frame-pieces near the handle being broken away to expose one of the retaining spring-catches; and Fig. 3 is an elevation of the manure-fork, illustrating the operation of dumping the gathered load of manure.

The nature of my invention consists in certain constructions, combinations, and arrangements of parts, hereinafter fully described and specifically claimed, whereby a manure-fork is produced which is drawn by horse or other animal, and can be dumped at pleasure by the attendant.

In the drawings, A represents two side frame-pieces, united by a transverse bar, B, at the back, and by a hinged fork-head or bar, C, at the front. The hinges c, which unite the frame-pieces A and the fork-head or bar C, are fastened to the lower parts of the same, and their fulcrum $c'$ is made to occupy a location rearward and downward from the fork-head or bar C, for reasons hereinafter explained. The forked head or bar C is provided with a number of long prongs, D, and a pulling connection, E, which latter is suitably fastened to the ends of the fork-head or bar C at $e$, and to which, in practice, the single-tree F or harness of a horse is attached.

To the front of the bar C, at $g$, one or more flexible straps or chains, G, are attached and extended backward and fastened to rods $G'$, which are connected to a cross-bar, H, at the end of the side frame-pieces A and in front of the bar B.

The bar H moves in guide-slots $i$, formed by the pieces A, bar B, and stepped metal bars I, fastened at $i^1$ to the side pieces and at $i^2$ to the bar B. The bar H is held against the bar B by means of spring-catches J, suitably inserted into the shafts A, and having their ends $j$ extended beyond the bar B, so that when the ends $j$ are depressed the bar H may be slipped forward to the end of the slot $i$.

Operation: The manure-fork is adjusted to the position shown in Fig. 2, the horse attached and then driven on, the attendant going along and holding up the bar B. The prongs D slide along the ground or flooring of a stable, and gather up the manure in the same manner as with a hand-fork.

When a sufficient amount of manure has accumulated upon the prongs D, the operator depresses the springs J by means of the handles $j$, whereupon the bar C, by reason of the resistance and weight of the manure upon the prongs, is pulled forward and swings over and around the points of the prongs as a fulcrum, thus dumping the manure and then passing over it, as illustrated in Fig. 3.

The straps G are, by this motion of the bar C, partly wound around it, and in consequence thereof the rods $G'$ pull the bar H forward from the position shown in Figs. 1 and 2 to that shown in Fig. 3.

After the dumped manure is passed by the prongs D the horse is backed slightly and the bar B pulled back by the attendant, whereby the points of the prongs again act as a fulcrum, over which the bar C swings backward until the manure-fork has assumed its former condition and position.

The bar H is now moved back again over the springs J by the attendant and secured against the bar B, and by this means the straps G are held taut, and prevent the bar C from turning around its fulcrum $c'$. The fulcrum $c'$, being back of the bar C and below the line $x\ x$ of the applied power, serves to lock the bar C and side pieces A by means of dead leverage, and thus, in a great measure, prevents the manure-fork from accidental dumping; but when more powerful obstacles here and there tend to overcome the dead leverage, the straps G and bar H serve as the principal check to such movement.

The operator, with his hands on the bars B and H, can readily tell, from the slight forward jerks of the bar H, when there is reason for exercising caution in the movement of the manure-fork.

Having described my invention, what I claim is—

In a manure-fork, the combination of the fork-head C, having a strap or chain, E, the fulcrum $c'$, straps G G', side pieces A, having slots $i$, handle B, spring-catches J, and bar H, substantially as and for the purpose set forth.

Witness my hand in the matter of my application for a patent for a manure-fork this 8th day of March, A. D. 1878.

BENJAMIN F. BARR.

Witnesses:
D. M. GOOD, Jr.,
SAMUEL H. BARR.